(12) United States Patent
Mattingly

(10) Patent No.: US 7,301,317 B1
(45) Date of Patent: Nov. 27, 2007

(54) OUTPUT CURRENT SHARING

(75) Inventor: Douglas M. Mattingly, Garner, NC (US)

(73) Assignee: Intersil Americas Inc., Milpitas, CA (US)

( * ) Notice: Subject to any disclaimer, the term of this patent is extended or adjusted under 35 U.S.C. 154(b) by 201 days.

(21) Appl. No.: 10/739,511

(22) Filed: Dec. 18, 2003

Related U.S. Application Data

(60) Provisional application No. 60/509,485, filed on Oct. 7, 2003.

(51) Int. Cl.
*G05F 1/40* (2006.01)
(52) U.S. Cl. .................................................. 323/282
(58) Field of Classification Search .............. 323/224, 323/268, 269, 282, 283, 285, 351
See application file for complete search history.

(56) References Cited

U.S. PATENT DOCUMENTS

| | | | | |
|---|---|---|---|---|
| 5,521,809 A | * | 5/1996 | Ashley et al. ................. 363/71 |
| 6,127,814 A | * | 10/2000 | Goder ........................... 323/282 |
| 6,433,527 B1 | * | 8/2002 | Izadinia et al. .............. 323/300 |
| 6,650,096 B2 | * | 11/2003 | Lee ............................... 323/272 |
| 6,683,441 B2 | * | 1/2004 | Schiff et al. ................. 323/222 |
| 6,696,825 B2 | * | 2/2004 | Harris et al. ................. 323/282 |
| 6,943,535 B1 | * | 9/2005 | Schiff ........................... 323/246 |
| 2003/0034762 A1 | * | 2/2003 | Tateishi ........................ 323/282 |

* cited by examiner

*Primary Examiner*—Adolf Berhane
(74) *Attorney, Agent, or Firm*—Gary R. Stanford

(57) ABSTRACT

A regulator with output current sharing including an output node and multiple converters. Each converter includes a PWM controller and switch circuit, an inductor, and an RC circuit. Each PWM controller and switch circuit receives a corresponding rail voltage and has a phase node and a regulation feedback input. Each inductor has a first end coupled to the output node and a second end coupled to a corresponding phase node. The RC circuit is coupled across the inductor and has an intermediate phase sense node coupled to a corresponding regulation feedback input. Each RC circuit may include an RC filter coupled across an inductor with an intermediate node and a feedback circuit coupled between the intermediate node and a regulation feedback input. The RC circuits may be configured to program a relative power distribution between the rail voltages to the shared output.

18 Claims, 3 Drawing Sheets

Figure 1:
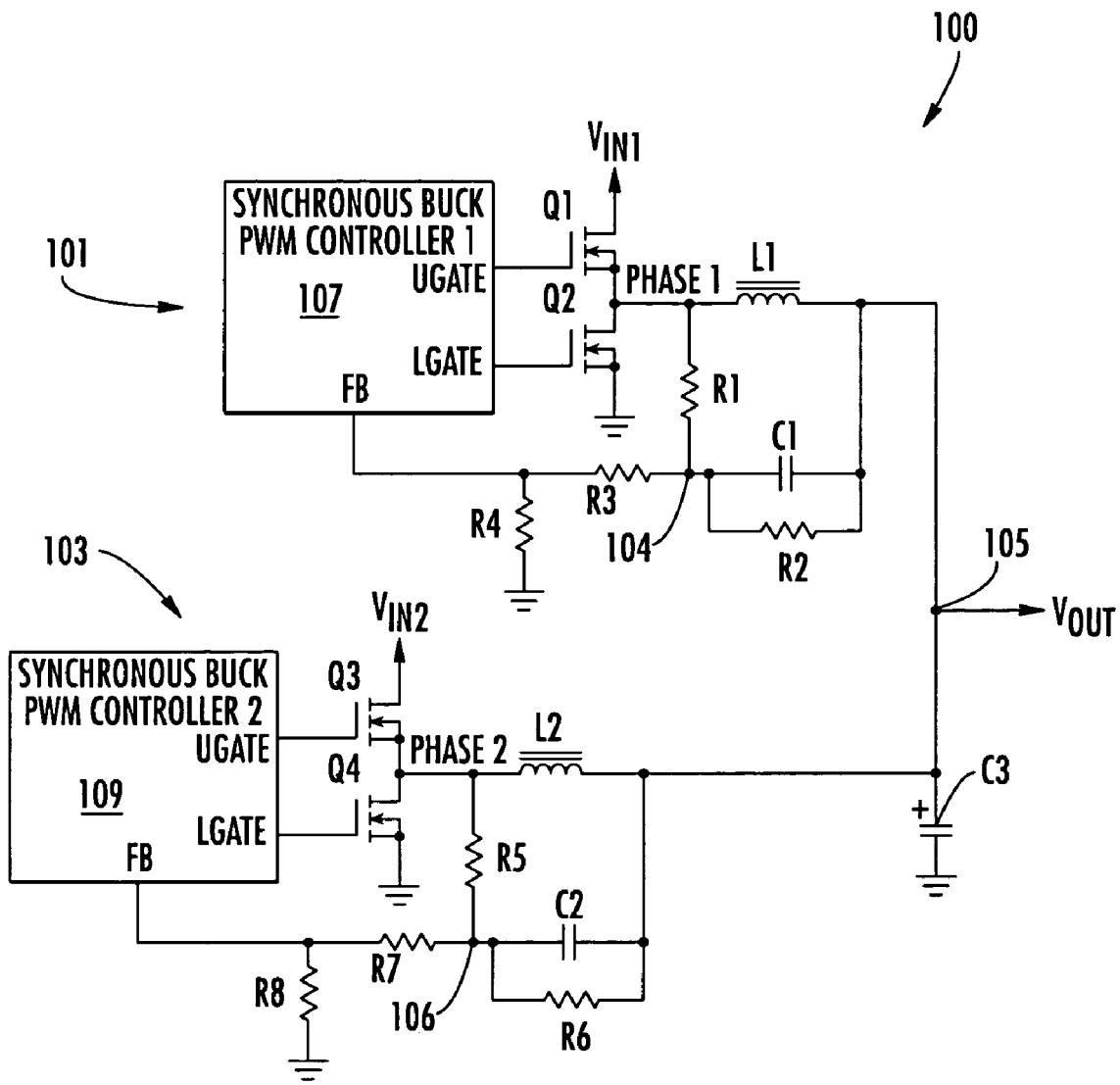

CURRENT SHARING RESULTS:

| (A) OUTPUT LOAD CURRENT | 5V SWITCHER CURRENT (A) | LOAD PERCENTAGE | 3.3V SWITCHER CURRENT (A) | % OF LOAD |
|---|---|---|---|---|
| 1 | 0.767 | 76.7% | 0.213 | 21.3% |
| 2 | 1.44 | 72.0% | 0.545 | 27.3% |
| 3 | 2.12 | 70.7% | 0.859 | 28.6% |
| 4 | 2.85 | 71.3% | 1.16 | 29.0% |
| 5 | 3.54 | 70.8% | 1.51 | 30.2% |
| 6 | 4.22 | 70.3% | 1.83 | 30.5% |
| 7 | 4.88 | 69.7% | 2.15 | 30.7% |
| 8 | 5.53 | 69.1% | 2.49 | 31.1% |
| 9 | 6.23 | 69.2% | 2.81 | 31.2% |
| 10 | 6.88 | 68.8% | 3.13 | 31.3% |
| 11 | 7.58 | 68.9% | 3.45 | 31.4% |
| 12 | 8.22 | 68.5% | 3.78 | 31.5% |
| 13 | 8.75 | 67.3% | 4.08 | 31.4% |
| 14 | 9.4 | 67.1% | 4.42 | 31.6% |
| 15 | 10.06 | 67.1% | 4.78 | 31.9% |
| 16 | 10.7 | 66.9% | 5.12 | 32.0% |
| | AVERAGE: | 69.7% | AVERAGE: | 30.1% |

CURRENT SHARING RESULTS:

| (A) OUTPUT LOAD CURRENT | 5V SWITCHER CURRENT (A) | LOAD PERCENTAGE | 3.3V SWITCHER CURRENT (A) | % OF LOAD |
|---|---|---|---|---|
| 1 | 0.31 | 30.2% | 0.72 | 69.8% |
| 2 | 0.60 | 29.7% | 1.41 | 70.3% |
| 3 | 0.89 | 29.6% | 2.11 | 70.4% |
| 4 | 1.18 | 29.5% | 2.82 | 70.5% |
| 5 | 1.47 | 29.4% | 3.53 | 70.6% |
| 6 | 1.76 | 29.4% | 4.23 | 70.6% |
| 7 | 2.04 | 29.2% | 4.94 | 70.8% |
| 8 | 2.33 | 29.2% | 5.65 | 70.8% |
| 9 | 2.62 | 29.2% | 6.34 | 70.8% |
| 10 | 2.90 | 29.1% | 7.05 | 70.9% |
| 11 | 3.20 | 29.2% | 7.76 | 70.8% |
| 12 | 3.48 | 29.2% | 8.45 | 70.8% |
| 13 | 3.78 | 29.2% | 9.16 | 70.8% |
| 14 | 4.07 | 29.2% | 9.87 | 70.8% |
| 15 | 4.36 | 29.2% | 10.57 | 70.8% |
| 16 | 4.64 | 29.1% | 11.28 | 70.9% |
|  | AVERAGE: | 29.4% | AVERAGE: | 70.6% |

FIG. 4

OUTPUT CURRENT SHARING

CROSS-REFERENCE TO RELATED APPLICATIONS

This application claims the benefit of U.S. Provisional Application No. 60/509,485 filed on Oct. 7, 2003, which is herein incorporated by reference for all intents and purposes.

BACKGROUND OF THE INVENTION

1. Field of the Invention

The present invention relates to DC-DC power regulators, and more particularly to a system and method for output current sharing among multiple DC-DC PWM converters using droop control feedback.

2. Description of the Related Art

In many electronic devices and systems, including computer systems and peripherals, it is often desired to combine power from two or more power sources. Multiple power supplies are desired, for example, when a single source is insufficient or when redundancy is desired or otherwise required. A computer system typically has multiple rail voltages or voltage source levels, such as, for example, 12 Volts (V), 5 V, 3.3 V, etc., where each rail is capable of providing a predetermined maximum amount of power (or current) according to a corresponding specification. If a device requires more power than any single voltage source can provide, the device combines power from multiple rails or sources. For example, plug-in peripheral cards, such as graphics cards or the like, receive power from one or more rails available on the expansion slot. Each rail of each slot typically has a specified voltage level and a maximum current rating, so that if the peripheral device requires more power than any one rail can provide within specified limits for that slot, the device must combine power from multiple rails. In some cases, if the available power from the slot is insufficient, an external power source, such as a disk drive power connector or the like, must be employed to provide the additional power.

A buck converter, also known as a step-down converter or down-converter, is a DC-DC converter that converts a higher voltage input (which may be from an unregulated source, such as a battery or the like), to a regulated lower voltage output. For example, a buck converter may be used to convert a higher rail voltage (e.g., 12 V, 5 V, 3.3 V, etc.) to the appropriate voltage level required by the device (e.g., 1.5 V). If any one available rail is unable to supply all of the power necessary, multiple buck converters are coupled in parallel so that the necessary power is provided from multiple rails. It is intended that each converter provide a proportionate share of the total current supplied to the device, especially under full load conditions.

The techniques for paralleling power converters is often inefficient. The outputs of multiple converters are often combined at an ORing or summing junction or the like, resulting in a loss of power through the ORing or summing junction devices. For example, the outputs may be combined using a resistor sharing network, resulting in power loss in each of the resistors. Alternatively, the outputs are coupled together in an OR configuration using ORing diodes or the like, resulting in power loss in each of the diodes. Such paralleling techniques do not always provide the desired level of current sharing among the converters, particularly during full-load conditions. Some converters may dominate or overwhelm other converters during certain load conditions, such as full-load or transient load conditions (sudden change in load, such as sudden load increase or decrease).

It is desired to provide more efficient current sharing among multiple power source rail voltages, especially under full load conditions. It is also desired to set the relative power sharing between the power sources regardless of the particular rail voltage levels provided to each.

SUMMARY OF THE INVENTION

A PWM down-converter according to an embodiment of the present invention for a current sharing system includes a PWM switching circuit, an inductor, an RC filter and a feedback circuit. The PWM switching circuit receives a rail voltage and has a phase node and a regulation feedback input. The inductor is coupled between the phase node and a shared output. The RC filter is coupled between the phase node and the shared output and has an intermediate node. The feedback circuit is coupled between the intermediate node and a corresponding regulation feedback input. In this manner, the regulation point is moved from the output to the phase node. The RC filter is placed across the inductor to filter out ripple and provide a corresponding filtered voltage, which is fed back to the regulation circuitry of the PWM switching circuit.

The RC filter and feedback circuit may be configured to program a relative power distribution from the rail voltage to the shared output. The relative power distribution may be programmed to achieve a selected ratio of load current from the rail voltage under full load condition of the shared output. The RC filter may include a resistor and a capacitor coupled in series forming the intermediate node. Another resistor may be coupled in parallel with the capacitor of the RC circuit. The feedback circuit may be implemented as a resistive voltage divider having an intermediate junction coupled to a corresponding regulation feedback input. The PWM switching circuit may be a buck converter or the like.

A regulator with output current sharing according to an embodiment of the present invention includes an output node and multiple converters. Each converter includes a PWM controller and switch circuit, an inductor, and an RC circuit. Each PWM controller and switch circuit receives a corresponding rail voltage and has a phase node and a regulation feedback input. Each inductor has a first end coupled to the output node and a second end coupled to a corresponding phase node. The RC circuit is coupled across the inductor and has an intermediate phase sense node coupled to a corresponding regulation feedback input.

The PWM controller and switch circuit may be implemented as a buck converter or the like. In one configuration, the PWM controller and switch circuit includes a PWM controller and first and second switches. The PWM controller has a UGATE output, an LGATE output and a regulation feedback input. The first switch has a gate coupled to the UGATE output, a drain coupled to a corresponding rail voltage and a source coupled to the phase node. The second switch has a gate coupled to the LGATE output, a drain coupled to the phase node and a source coupled to ground. Each PWM controller and switch circuit may include a PWM controller implemented on a common integrated circuit.

A method of sharing load current among a plurality of PWM down-converters to a common output node according to an embodiment of the present invention includes, for each converter, filtering ripple across an inductor and providing a filtered voltage, and regulating a phase node at one end of the inductor using a feedback circuit coupled to a regulation control input and receiving the filtered voltage. Each PWM down-converter is coupled to a corresponding rail voltage and includes a regulation control input, a phase node, an inductor coupled between the phase node and the output node, and a PWM switch circuit controlled by the regulation control input.

The method may include coupling an RC filter across the inductor having an intermediate node providing the filtered voltage. The method may further include adjusting the feedback circuit and the RC filter for each PWM down-converter to program a percentage of load current provided by each rail voltage under full load conditions.

BRIEF DESCRIPTION OF THE DRAWING(S)

Figures 2, 3:
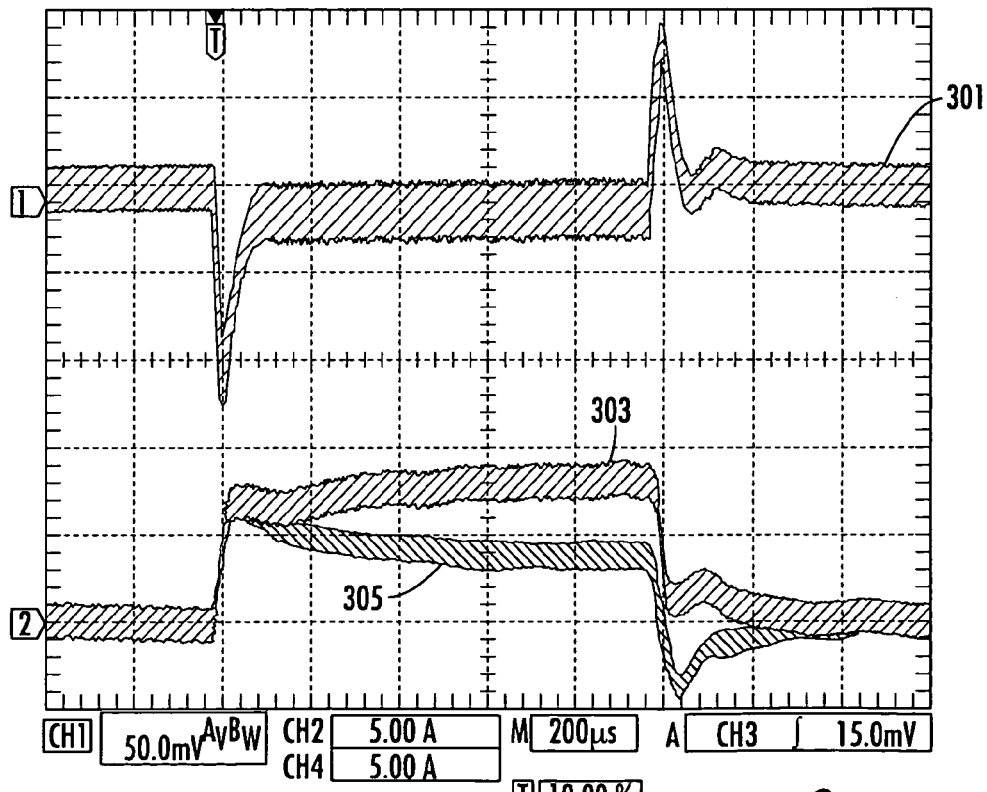

The benefits, features, and advantages of the present invention will become better understood with regard to the following description, and accompanying drawing where:

FIG. 1 is a schematic diagram of a regulator with multiple DC-DC converters coupled to implement a lossless output current sharing system according to an exemplary embodiment of the present invention;

FIG. 2 is a table illustrating operation of a first exemplary configuration of the regulator of FIG. 1 in which 5 V and 3.3 V rails are provided and where the 5 V rail supplies approximately 70% of the output current at full load;

FIG. 3 is a graph diagram illustrating the transient current response of the regulator of FIG. 1 configured according to the table of FIG. 2; and FIG. 4 is a table illustrating operation of a second exemplary configuration of the regulator of FIG. 1 in which 5 V and 3.3 V rails are provided and where the 3.3 V rail supplies approximately 70% of the output current at full load.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

FIG. 1 is a schematic diagram of a regulator 100 implemented with a lossless output current sharing system according to an exemplary embodiment of the present invention. The regulator 100 includes a first buck converter 101 that down-converts from a first rail voltage VIN1 and a second buck converter 103 that down-converts from a second rail voltage VIN2 to generate a single output voltage signal VOUT on a single shared output node 105. Each converter 101 and 103 is configured in substantially the same manner. The converter 101 includes a pulse-width modulation (PWM) controller 107 with an upper gate (UGATE) output and a lower gate (LGATE) output and a feedback (FB) input. The PWM controller 107 includes regulation circuitry (not shown) that regulates the operation of the controller 107 based on the signal at the FB input as known to those skilled in the art. The UGATE output is coupled to the control input of a switch Q1, having current terminals coupled between the VIN1 voltage and a phase node PHASE1. The LGATE output is coupled to the control input of a switch Q2, having current terminals coupled between the PHASE1 node and ground. The PHASE1 node is coupled to one end of an output inductor L1 and to one end of a resistor R1. The other end of the resistor R1 is coupled to one end of a capacitor C1 at an intermediate phase sense node 104, to one end of a resistor R2, and to one end of another resistor R3. The other ends of the inductor L1, the capacitor C1 and the resistor R2 are coupled to the output node 105. The other end of the resistor R3 is coupled to the FB input of the PWM controller 107 and to one end of a resistor R4, having its other end coupled to ground.

The converter 103 includes a PWM controller 109, switches Q3 and Q4, output inductor L2, resistors R5, R6, R7 and R8 and capacitor C2, which are coupled in substantially the same manner as the PWM controller 107, switches Q1 and Q2, output inductor L1, resistors R1, R2, R3 and R4 and the capacitor C1, respectively, of the converter 101. The PWM controller 109 also includes regulation circuitry (not shown) that regulates the operation of the controller 109 based on the signal at the FB input as known to those skilled in the art. An output filter capacitor C3 is coupled between the output node 105 and ground. The switches Q3 and Q4 have current terminals coupled in series between the VIN2 voltage and ground at a phase node PHASE2. The junction between the resistor R5 and the capacitor C2 is another intermediate phase sense node 106.

In the embodiment shown, the switches Q1-Q4 are implemented as N-channel metal-oxide semiconductor, field-effect transistors (MOSFETs), although other types of switches are contemplated including semiconductor switches suitable for IC fabrication. In the case of MOSFETs, the drains of Q1 and Q3 are coupled to the rail voltages VIN1 and VIN2, respectively, the sources of Q1 and Q3 and the drains of Q2 and Q4 are coupled to the phase nodes PHASE1 and PHASE2, respectively, and the sources of Q2 and Q4 are coupled to ground.

In the specific embodiment shown, the converters 101 and 103 are buck converters, although other down-converters are contemplated. For converter 101, the resistors R1, R2 and the capacitor C1 form an RC filter placed across the inductor L1 to filter out ripple and the filtered voltage is fed back to the FB input of the PWM controller 107 via the resistors R3 and R4 coupled as a voltage divider. For the converter 103, the resistors R5, R6 and the capacitor C2 form an RC filter placed across the inductor L2 to filter out ripple and the filtered voltage is fed back to the FB input of the PWM controller 109 via the resistors R7 and R8 coupled as a voltage divider. In an alternative embodiment, the resistor R2 is removed and the values of the remaining components R1, C1, R3 and R4 are adjusted accordingly to achieve the desired results (e.g., the desired level of current sharing). Also in the alternative embodiment, the resistor R6 is removed and the values of the remaining components R5, C2, R7 and R8 are adjusted accordingly to achieve the desired results.

For the converter 101, the PWM controller 107 turns Q1 on and Q2 off to couple VIN1 to the output node 105 via the inductor L1. When a voltage condition is met at the FB input to the PWM controller 107, the PWM controller 107 turns Q1 off and Q2 on and current flows through the switch Q2. The converter 103 operates in substantially the same manner, and both converters 101 and 103 share output current provided to the output node 105 to develop the voltage VOUT. For both converters 101 and 103, the regulation point is moved from the output as is normally the case to the PHASE node (e.g., from node 105 to node PHASE1 for converter 101 and from node 105 to node PHASE2 for converter 103) to implement droop through the output inductors L1 and L2.

The sharing of output current between the two converters 101 and 103 is dependent upon the droop being implemented and not the input rail voltage. Proper selection of droop components allows for a predetermined percentage of the load current to be supplied by a desired rail. The converters 101 and 103 of the regulator 100 may be implemented using discrete components or integrated on a chip (IC) or a combination of both. In an exemplary configuration, the PWM controllers 107 and 109 are both implemented on the same IC, such as the ISL6225 Dual PWM controller by the Intersil Corporation. An advantage of using dual PWM controllers on a single chip is the elimination of any differences of the respective reference voltages of the PWM regulators.

FIG. 2 is a table 200 illustrating operation of a first exemplary configuration of the regulator 100. In the table 200, the current values are listed in Amperes (A). In this case, VIN1 is 5 V, VIN2 is 3.3 V, VOUT is approximately 1.4 V, and it is desired that the converter 101 provide approximately 70% of the load current when under full load conditions while the converter 103 provides approximately 30% of the load current. For the converter 101 coupled to the 5 V rail, L1=2 microHenries (µH) with a DC resistance (DCR) of 4.92 milliohms (mΩ), R3=17.8 kilohms (kΩ), R1=20.0 kΩ, R2=6.49 kΩ, R4=36.5 kΩ, and C1=0.1 µFarads (µF) (all values being approximate). For the converter 103 coupled to the 3.3 V rail, L2=2 µH with 4.92 mΩ DCR, R7=17.8 kΩ, R5=10.0 kΩ, R6=12.7 kΩ, R8=31.6 kΩ, and C2=0.1 µF (again, all values being approximate). As shown in table 200, the 5 V converter 101 supplies approximately 70% of the load (or output) current while the 3.3 V converter 103 supplies approximately 30% of the load current.

FIG. 3 is a graph diagram illustrating the transient current response of the regulator 100 configured according to table 200 (with the values previously listed). The output voltage (VOUT) is shown by curve 301, the current of VIN1 (5 V) through L1 is shown by curve 303 and the current of VIN2 (3.3 V) through L2 is shown by curve 305. Although not shown, start up tests show that, while in steady state the regulator 100 does not push current into either of the input rails, the 3.3 V rail sinks current as the 5 V rail sources current. This occurs regardless of which rail comes up first. The current pushed into the 3.3 V rail is very brief. Distributed capacitance and other loading on the 3.3 V rail helps to alleviate this situation. Also, this situation can be avoided by keeping the 3.3 V rail disabled until the output voltage exceeds a specified limit.

FIG. 4 is a table 400 illustrating operation of a second exemplary configuration of the regulator 100. In the table 400, the current values are listed in Amperes (A). In this case, VIN1 is 5 V, VIN2 is 3.3 V, VOUT is approximately 1.4 V, and it is desired that the converter 101 provide approximately 30% of the current when under full load conditions while the converter 103 provides approximately 70%. In other words, the current capacities are reversed so that the 3.3 V rail provides most of the current. For the converter 101 coupled to the 5 V rail, L1=2 µH with 4.92 mΩ DCR, R3=17.8 kΩ, R1=10.0 kΩ, R2=8.87 kΩ, R4=39.3 kΩ, and C1=0.1µ µF (again all values being approximate). For the converter 102 coupled to the 3.3 V rail, L2=2 µH with 4.92 mΩ DCR, R7=17.8 kΩ, R5=20.0 kΩ, R6=4.22 kΩ, R8=36.2 kΩ, and C2=0.1 µF (again, all values being approximate). As shown in table 400, the 5 V converter 101 supplies approximately 30% of the load current while the 3.3 V converter 103 supplies approximately 70% of the load current.

In another exemplary configuration (not shown), the rail voltages are 12V and 5V and the component values are the same, e.g., L1=L2=10 µH with 28 mΩ DCR, R3=R7=18.2 kΩ, R1=R5=35 kΩ, R2 and R6 are removed (alternatively, the resistors R2 and R6 can be added and made the same value), R4=R8=24.3 kΩ, and C1=C2=0.01 µF (again, all values being approximate). In this case, the 5 V and 12 V rails each source approximately 50% of the current at a full load current level of approximately 12 A. Under lower load conditions, the 12 V rail tends to drive more current, almost up to 70% at 2A output current level. Nonetheless, neither rail is driven beyond its predetermined maximum output power limit and the desired current sharing is achieved under full load conditions.

In this manner, it is appreciated that the droop and feedback component values are changed to program the relative power distribution from the rails to the load. The voltage, droop and feedback component values may be made substantially the same to achieve approximately 50% current sharing between the rails to the load under full load conditions. For different voltage levels, the droop and feedback component values are adjusted to achieve any desired level of current sharing between the rails to the load under full load conditions, although under no-load or lower loads, one rail may provide more current than the other. Again, the sharing of current between the regulators is dependent upon the droop rather than the input rail voltages. Other common voltage levels are contemplated, such as 12 V.

For the embodiments in which the PWM controllers are implemented on one IC, the rail voltages can be any voltage between the reference voltage of the regulators to the maximum allowable PHASE pin voltage of the IC. Although only two converters are shown coupled together at the common output, in alternative embodiments, any number of converters are paralleled, each converter using the lossless droop method according to the present invention. The droop component values are programmed so that each converter provides a target percentage of the total load current under full load conditions. For example, it is contemplated that converters for three rails of 12 V, 5 V and 3.3 V are paralleled together to provide a single output voltage with shared output current load.

The following steps and equations may be used to calculate the RC network across the output inductor for a single converter of a multi-converter regulator, such as the regulator 100. This process should be repeated for each converter of the regulator. The following terms are used in the equations: VREF is an internally generated reference voltage of the converter, IFL is the full load current of the converter, VOUTNL is the output voltage of the regulator at no load, VOUTFL is the output voltage of the regulator at full load, VDDROOP is the desired droop for the regulator calculated as VOUTNL−VOUTFL, L1 is the inductance of the output inductor of the converter, DCR is the DCR value of the output inductor L1, and VNDROOP is the natural droop calculated as IFL*DCR, where an asterisk "*" denotes multiplication.

The converter 101 is used as the exemplary converter for purposes of illustration. The first step is to choose values for the resistors R1 and R3, which are selected to be within appropriate ranges suitable for the converter. The next step is to calculate R2 if it is to be used. If VNDROOP−VDDROOP=0, then R2 is not used. R2 is calculated according the equation: R2=(R1*VDDROOP)/(IFL*DCR−VD−

DROOP), where the slash "/" denotes division. The next step is to calculate R4 according to the equation: R4={VREF[R3+(R1*R2)/(R1+R2)]}/{VOUTFL−VREF+[(DCR*IFL*R2)/(R1+R2)]}. The next step is to calculate REQUIV according to the equation: REQUIV=(R1*R2*R3)/(R1*R2+R1*R3+R2*R3). Finally, C1 is calculated according to the equation: C1=L1/(REQUIV*DCR).

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing out the same purposes of the present invention without departing from the spirit and scope of the invention as defined by the appended claims.

The invention claimed is:

1. A PWM down-converter for a current sharing system, comprising:
    a first PWM converter, comprising:
        a first PWM switching circuit receiving a first rail voltage and having a first phase node and a first regulation feedback input;
        a first inductor coupled between said first phase node and a shared output;
        a first RC filter coupled between said first phase node and said shared output and having a first intermediate node; and
        a first feedback circuit coupled between said first intermediate node and said first regulation feedback input; and
    a second PWM converter, comprising:
        a second PWM switching circuit receiving a second rail voltage and having a second phase node and a second regulation feedback input, wherein said first rail voltage and said second rail voltage have different voltage levels;
        a second inductor coupled between said second phase node and said shared output;
        a second RC filter coupled between said second phase node and said shared output and having a second intermediate node; and
        a second feedback circuit coupled between said second intermediate node and said second regulation feedback input; and
    wherein said first RC filter and said first feedback circuit are configured to program a predetermined first percentage of full power distribution to said shared output, and wherein said second RC filter and said second feedback circuit are configured to program a predetermined second percentage of full power distribution to said shared output.

2. The PWM down-converter of claim 1, wherein said first and second percentages are programmed to achieve a selected ratio of load current under full load conditions of said shared output.

3. The PWM down-converter of claim 1, wherein said first RC filter comprises a first resistor and a capacitor coupled in series forming said first intermediate node.

4. The PWM down-converter of claim 3, wherein said first RC filter further comprises a second resistor coupled in parallel with said capacitor.

5. The PWM down-converter of claim 1, wherein said first feedback circuit comprises a resistive voltage divider having an intermediate junction coupled to said first regulation feedback input.

6. The PWM down-converter system of claim 1, wherein said first PWM switching circuit comprises a buck converter.

7. A regulator with output current sharing, comprising:
    an output node; and
    a plurality of converters, each comprising:
        a PWM controller and switch circuit receiving a corresponding one of a plurality of unequal rail voltages and having a phase node and a regulation feedback input;
        an inductor having a first end coupled to said output node and a second end coupled to said phase node; and
        an RC circuit coupled across said inductor and having an intermediate phase sense node coupled to said regulation feedback input; and
    wherein said RC circuit of each of said plurality of converters is configured to provide a corresponding one of a plurality of predetermined percentages of power distribution to said output node.

8. The regulator of claim 7, wherein said RC circuit comprises:
    a first resistor coupled between said phase node and said intermediate phase sense node; and
    a capacitor coupled between said intermediate phase sense node and said output node.

9. The regulator of claim 8, wherein said RC circuit further comprises a second resistor coupled in parallel with said capacitor.

10. The regulator of claim 9, further comprising:
    a third resistor coupled between said regulation feedback input and said intermediate phase sense node; and
    a fourth resistor coupled between said regulation feedback input and ground.

11. The regulator of claim 8, further comprising:
    a second resistor coupled between said regulation feedback input and said intermediate phase sense node; and
    a third resistor coupled between said regulation feedback input and ground.

12. The regulator of claim 7, wherein said PWM controller and switch circuit comprises a buck converter.

13. The regulator of claim 12, wherein said PWM controller and switch circuit comprises:
    a PWM controller having a UGATE output, an LGATE output and a regulation feedback input;
    a first switch having a gate coupled to said UGATE output, a drain coupled to a corresponding rail voltage and a source coupled to said phase node; and
    a second switch having a gate coupled to said LGATE output, a drain coupled to said phase node and a source coupled to ground.

14. The regulator of claim 13, wherein each of said first and second switches comprises an N-channel MOSFET.

15. The regulator of claim 13, wherein each PWM controller and switch circuit includes a PWM controller implemented on a common integrated circuit.

16. A method of sharing load current among a plurality of PWM down-converters to a common output node, each PWM down-converter coupled to a corresponding one of a plurality of unequal rail voltages and including a regulation control input, a PWM switch circuit controlled by said regulation control input and having a phase node, and having an inductor coupled between the phase node and the output node, said method comprising:
    for each PWM down-converter, filtering ripple across the inductor with an RC filter and providing a filtered voltage;

for each PWM down-converter, regulating the phase node using a feedback circuit coupled to the regulation control input and receiving the filtered voltage;

for each PWM down-converter, configuring the RC filter and the feedback circuit to provide relative percentage of power distribution to the common output node; and wherein said configuring the RC filter for at least two of the plurality of PWM down-converters comprises configuring a predetermined percentage of power distribution relative to each other.

17. The method of claim 16, wherein said filtering ripple comprises coupling the RC filter across the inductor having an intermediate node providing the filtered voltage.

18. The method of claim 17, further comprising adjusting the feedback circuit and the RC filter for each PWM down-converter to program a percentage of load current provided by each rail voltage under full load conditions.

* * * * *